United States Patent
Kontsos et al.

(10) Patent No.: US 10,845,187 B2
(45) Date of Patent: Nov. 24, 2020

(54) MULTISCALE DEFORMATION MEASUREMENTS LEVERAGING TAILORABLE AND MULTISPECTRAL SPECKLE PATTERNS

(71) Applicant: Drexel University, Philadelphia, PA (US)

(72) Inventors: Antonios Kontsos, Philadelphia, PA (US); Fnu Melvin Domin Mathew, Philadelphia, PA (US); Andrew James Ellenberg, Blackwood, NJ (US); Ivan Bartoli, Ardmore, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 16/289,842

(22) Filed: Mar. 1, 2019

(65) Prior Publication Data
US 2019/0271537 A1 Sep. 5, 2019

Related U.S. Application Data

(60) Provisional application No. 62/637,454, filed on Mar. 2, 2018.

(51) Int. Cl.
*G01B 11/16* (2006.01)
*G06T 7/00* (2017.01)
(Continued)

(52) U.S. Cl.
CPC .......... *G01B 11/162* (2013.01); *G01B 11/16* (2013.01); *G01B 11/167* (2013.01);
(Continued)

(58) Field of Classification Search
CPC ..... G01B 11/162; G01B 11/167; G01B 11/16; G01N 2021/479; G01N 2021/95615;
(Continued)

(56) References Cited

U.S. PATENT DOCUMENTS

| 5,801,824 A * | 9/1998 | Henley | ................. G01N 21/94 356/237.2 |
| 9,852,514 B2 * | 12/2017 | Petiot | .................... G01M 5/005 |

(Continued)

*Primary Examiner* — Tri T Ton
(74) *Attorney, Agent, or Firm* — Joseph E. Maenner; Maenner & Associates, LLC

(57) ABSTRACT

Remote measurements using images are particularly useful in structural health monitoring cases in which the installation of contact sensors is difficult. Some limitations, though, associated with photogrammetry-type optical metrology involve the application of speckle patterns, which become even more important with variable working distance or when the required resolution and sensitivity are not a priori known. In this context, multispectral sensing combined with tailored speckle patterns can circumvent some of the challenges of acquiring data at different working distances. The present invention uses multispectral imaging combined controlled generation of speckle patterns to demonstrate an approach for remote sensing related to deformation measurements at the structural level. To demonstrate this approach, two speckle patterns were designed for measurements at specified working distances. The results show that the spectral specific reflectivity of the speckle patterns allow for spatial overlay without affecting imaging within either spectral range considered, which results in the extraction of multiscale deformation measurements.

14 Claims, 18 Drawing Sheets

(51) Int. Cl.
*G01N 21/93* (2006.01)
*G01N 21/956* (2006.01)
*G01N 21/47* (2006.01)

(52) U.S. Cl.
CPC ......... *G01N 21/4788* (2013.01); *G01N 21/93* (2013.01); *G01N 21/95607* (2013.01); *G06T 7/001* (2013.01); *G01N 2021/479* (2013.01); *G01N 2021/95615* (2013.01); *G06T 2207/10036* (2013.01)

(58) Field of Classification Search
CPC ............... G01N 21/4788; G01N 21/93; G01N 21/95607; G06T 2207/10036; G06T 7/001
USPC ....................... 356/237.1–237.6, 239.1–239.8
See application file for complete search history.

(56) References Cited

U.S. PATENT DOCUMENTS

| | | | |
|---|---|---|---|
| 2014/0036042 A1* | 2/2014 | Xia | G02B 21/361 348/49 |
| 2016/0025645 A1* | 1/2016 | Huang | G01N 21/9501 356/237.2 |

* cited by examiner

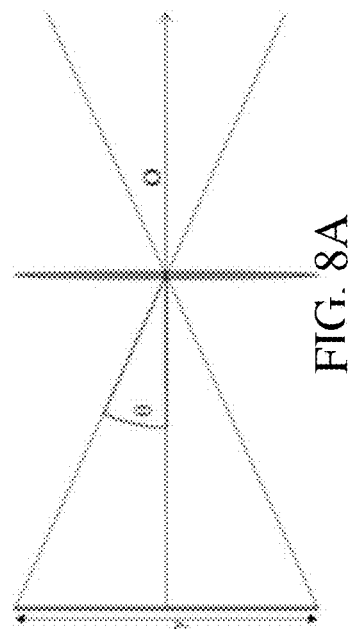
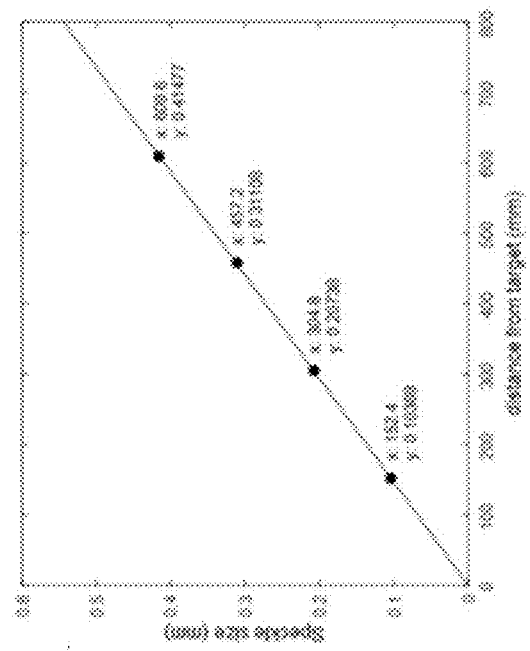
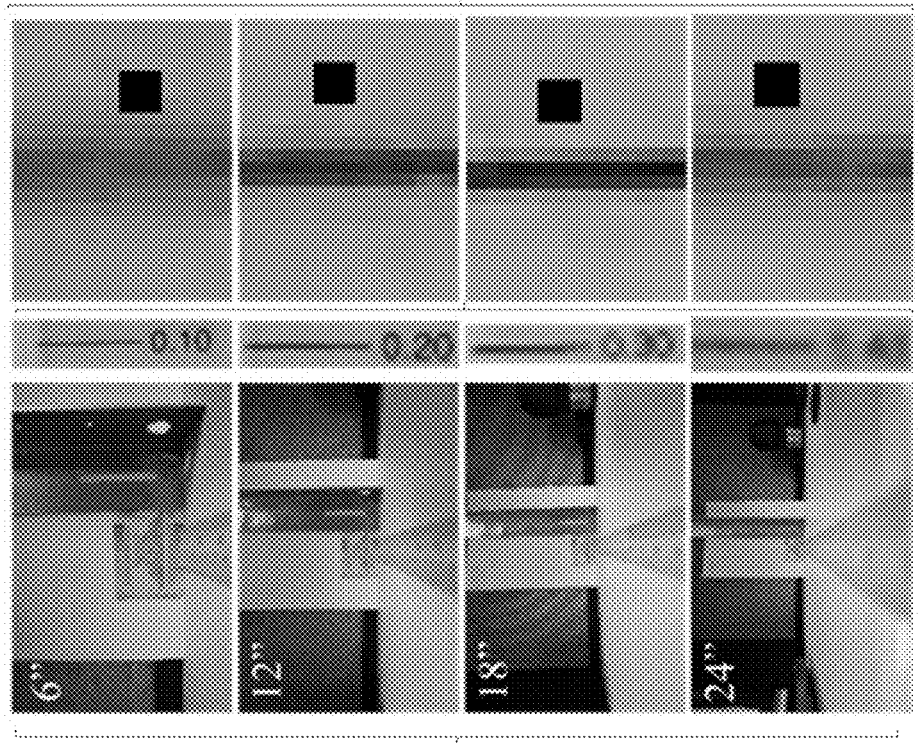
FIG. 8A  FIG. 8E
FIG. 8B  FIG. 8C  FIG. 8D

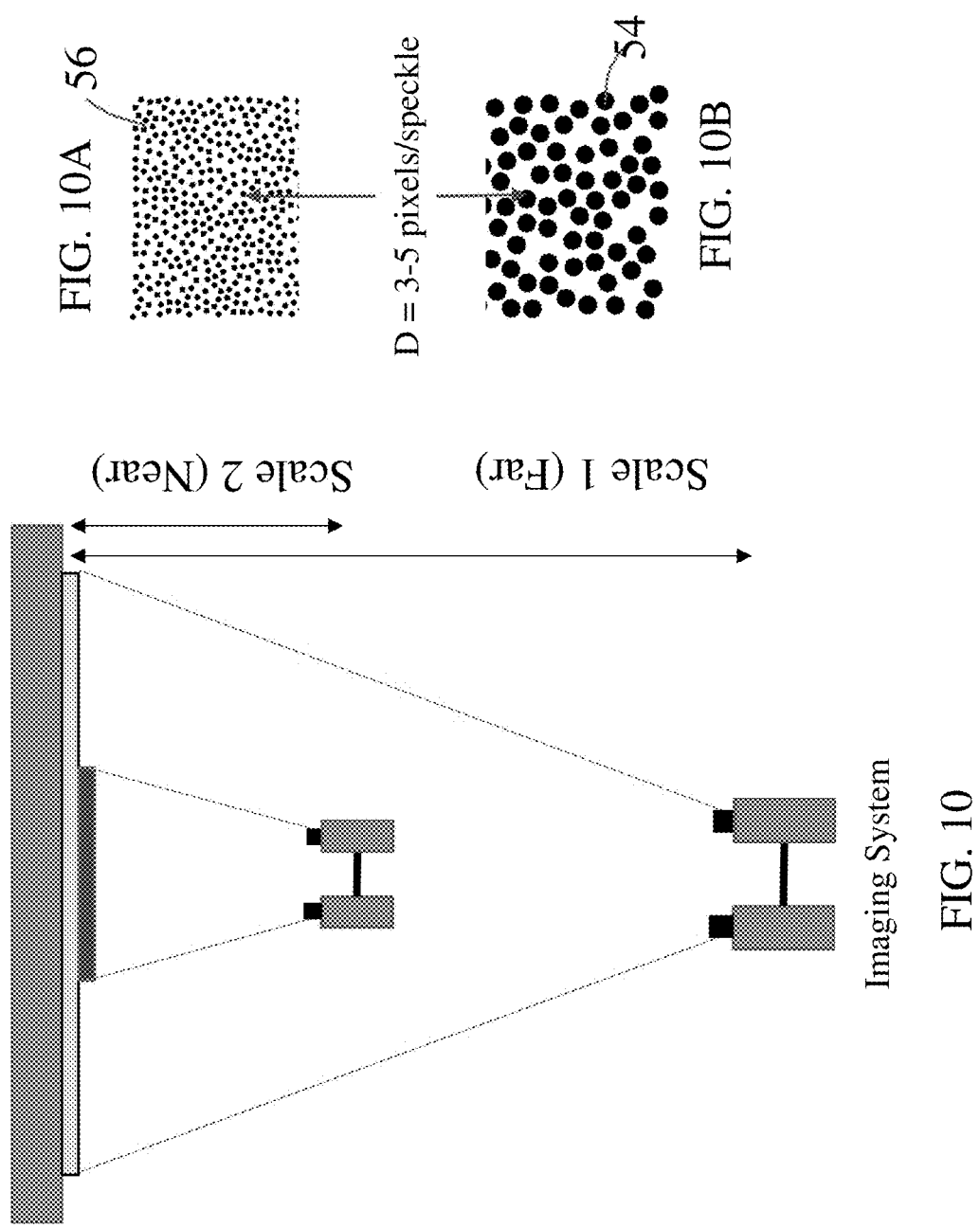

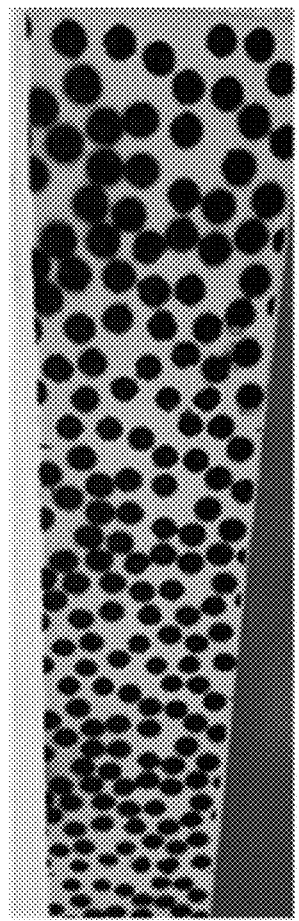
FIG. 11B1
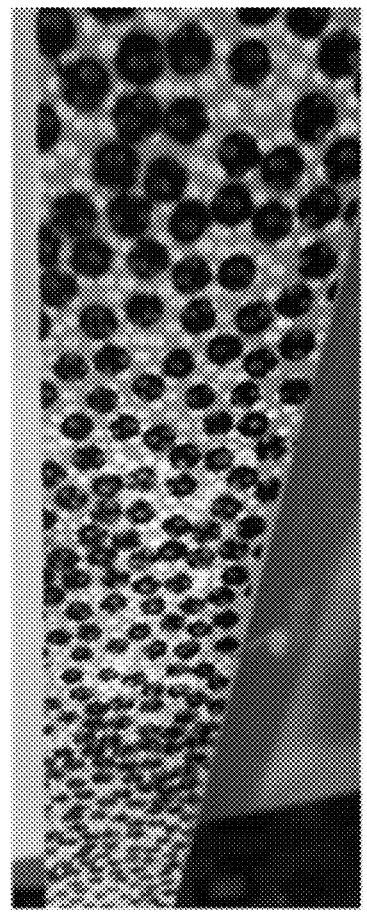
FIG 11B2
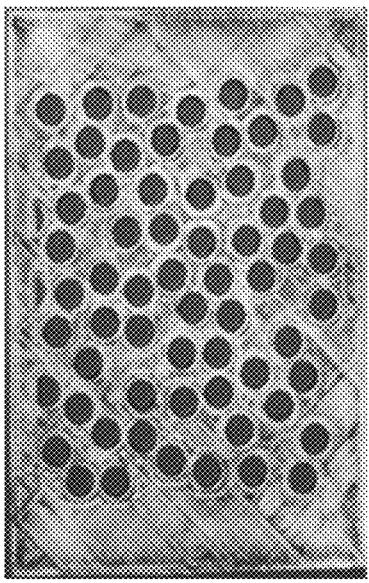
FIG. 11A1
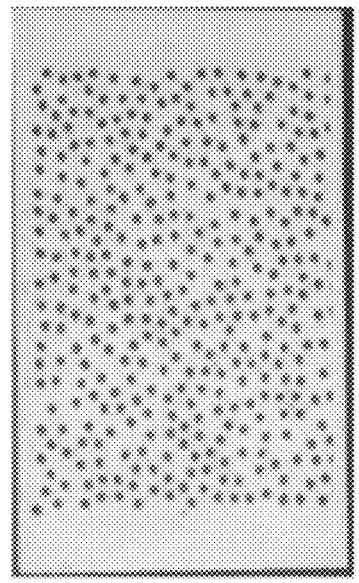
FIG. 11A2

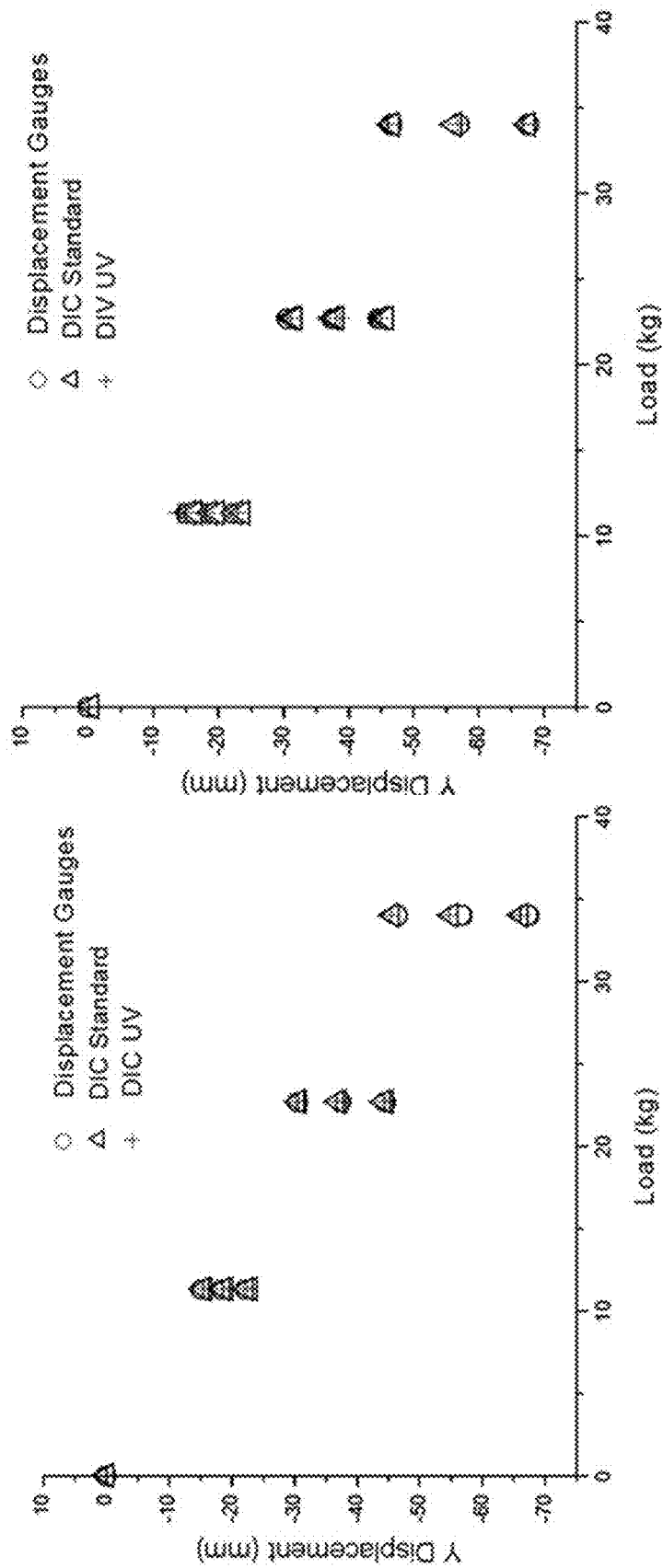

MULTISCALE DEFORMATION MEASUREMENTS LEVERAGING TAILORABLE AND MULTISPECTRAL SPECKLE PATTERNS

CROSS-REFERENCE TO RELATED APPLICATION

This application claims the benefit of U.S. Provisional Patent application Ser. No. 62/637,454, filed on Mar. 2, 2018, which is incorporated herein by reference in its entirety.

STATEMENT OF GOVERNMENT INTEREST

This invention was made with government support under Contract No. 1538389 awarded by the National Science Foundation. The government has certain rights in the invention.

BACKGROUND OF THE INVENTION

Deformation measurements on materials and structures across length scales are currently obtained routinely by using contact sensing methods such as displacement and strain gauges, as well as fiber optics among others. These sensing methods typically provide high accuracy data that can be used to assess, for example, the state of structural health. It is often difficult, however, to install, operate and maintain a network of such sensors which results into both time and cost issues. In this context, several other methodologies including remote sensing systems have been proposed to offer solutions to some of the limitations of current contact sensors. Presently, a method is described to obtain multiscale deformation measurements by developing speckle patterns that can be leveraged in remote sensing.

Image-based deformation measurements using point-based methods have been reported in several applications. Point-based methods such as the digital image correlation (DIC) method require the existence of fiducial markers within the acquired images that are tracked in a field of view (FOV) to obtain measurements from which deformation is computed. Specifically, uniquely identifiable targets can be digitally tracked in terms of their two-dimensional (planar) or three-dimensional (surface plus out-of-plane) coordinates using a single or multiple camera systems, respectively. A group of such targets can then provide a point cloud from which deformation fields can be obtained. For example, such point-based optical measurement techniques were reported for deformation measurements on structural elements such as beams in laboratory conditions. Furthermore, markers were applied at the structural scale to track movement, for example of a wind turbine, using stereo high-speed cameras. Other examples include deformation measurements of an in-service railway bridge while a train was passing through. To perform such measurements, commercial systems have been developed that record images containing points with coded and uncoded markers and with the calibration settings provided by appropriate panels. In addition, color image sensors were used to measure evolving multicomponent displacement fields for structural dynamics problems. Work has also been done on assisting expert users with devices capable of accurately extracting spatial coordinates from light emitters towards structural analyses with the use of artificial intelligence. More recently, the inventors of this patent extended the use of optical metrology to unmanned aerial systems and measured remotely beam deflections.

In parallel, DIC method has been used extensively in applications ranging from the micro- to the structural scale. In this context, two-dimensional DIC can be performed with a single camera. This version of the method provides only planar deformation fields. In the case that stereoscopic vision is employed using a set of cameras both planar and out of plane measurements can be made. Stereo-DIC has also been extensively explored for experimental testing and several commercial systems exist. The DIC method works by tracking uniquely identifiable features of the specimen across a number of acquired images. Continuous monitoring and unique tracking is ensured either by the texture of the surface itself or by the application of an appropriate speckle pattern.

Multiple metrics have been proposed to determine the quality of a speckle pattern with relation to systematic and random errors. In DIC the spatial properties of such patterns are strongly associated with the choice of a corresponding working distance which dictates the actual FOV, often also imposed by physical and technical constraints. The establishment of a FOV practically leads to the fact that for any other distance than the one used to define it based on camera settings, aliasing or smoothing of the pattern will occur depending on whether the new distance is greater or smaller than the one used to define the FOV. To mitigate this challenge, multiple patterns can be applied to the structure to achieve simultaneous measurements in multiple scales or from multiple distances. For example, Passieux et al. used a multiscale spray consisted of a combination of a coarse and fine painted speckle pattern on an open hole specimen. The finer speckle pattern was applied near the hole to get near field displacement data while the coarse pattern spread the face of the rest of the specimen tracking global response. A similar approach is known to use E-beam lithography to obtain microscale speckles, while the macroscopic pattern was applied by conventional paint.

A potential issue, however, with applying speckle patterns for single or multiscale measurements in the visible spectrum is that they potentially affect negatively the aesthetic appearance of the inspected structure in addition to also interfere with other concurrent assessments, for example discoloration observations associated with corrosion. Moreover, overlaying finer speckles within regions already covered in coarser speckles hinder the ability to detect deformation within the coarser zones.

In this context, the use of DIC using sources other than the visible light has been reported. For example, in high temperature mechanical testing experiments ultraviolet (UV) light was successfully used up to 1125° C. The reason is that a high temperature rated paint provides deformation measurements that is less affected by thermally induced strains at higher temperatures in comparison to similar results obtained using either white or filtered blue light.

BRIEF SUMMARY OF THE INVENTION

Briefly, the invention is a system that uses multispectral image data to remotely obtain point coordinates that are used to calculate deformation at the structural level. To achieve this, principles of DIC are used in conjunction with optical information based on speckle patterns a priori placed on the monitored structures. By using speckle patterns with optimized spectral properties the method can be applied to calculate deformation from different distances and at different length scales.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 8A provides a schematic representation of the variables in Eq. (3;

FIG. 8B provides images of a crack card obtained at different distances;

FIG. 8C provides image close-ups and comparison with the minimum acceptable speckle size in pixels for the camera and lens using in this investigation FIG. 8D shows theoretically determined speckle sizes as a function of distance;

FIG. 8E shows the experimentally and theoretically determined speckle sizes as a function of distance from the target;

FIG. 10 shows generation of pseudo-random optimized speckle patterns for predetermined fields of view;

FIG. 10A shows a first speckle pattern;

FIG. 10B show a second speckle pattern;

FIG. 11A1 shows: stencils used to apply 6 mm diameter dots

FIG. 11A2 shows stencils used to apply 2 mm diameter dots

FIG. 11B1 shows resulting multiscale and multispectral patterns on a beam using the stencil of FIG. 11A1;

FIG. 11B2 shows resulting multiscale and multispectral patterns on the beam using the stencil of FIG. 11A2;

FIG. 16A shows displacement measurements at 2 m;

FIG. 16B shows displacement measurements at 6 m;

DETAILED DESCRIPTION OF THE INVENTION

Figure 1:
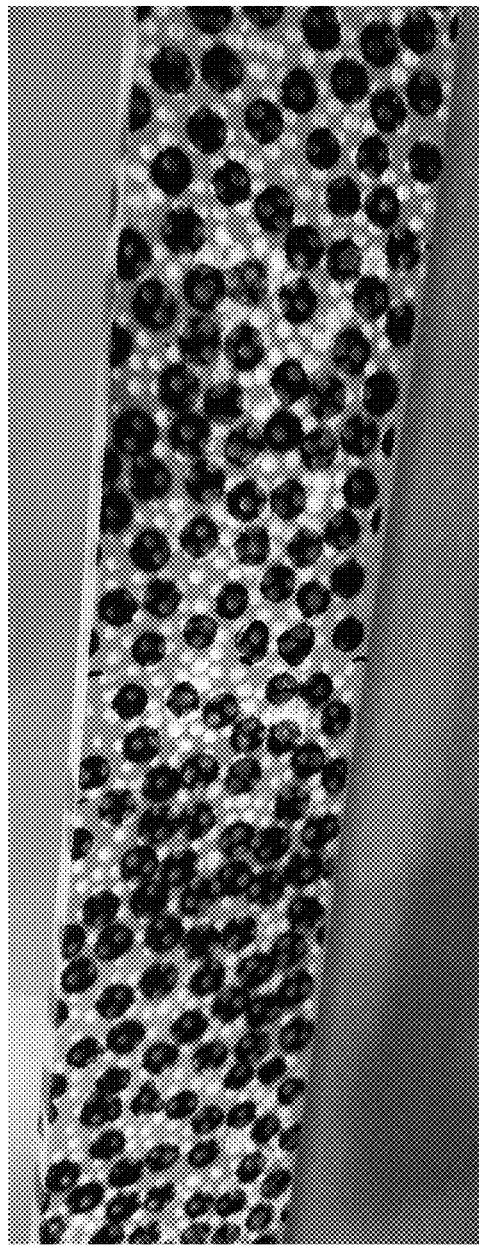
FIG. 1 is an exemplary speckle pattern applied to a structure for use with the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As shown in the Figures, the present invention is a multiscale deformation monitoring system and a method of monitoring a structure using the multiscale deformation monitoring system.

FIG. 1 provides an exemplary multispectral speckle pattern applied to a structure for use with the present invention. The pattern is tailored to a predetermined working distance.

Figure 2:
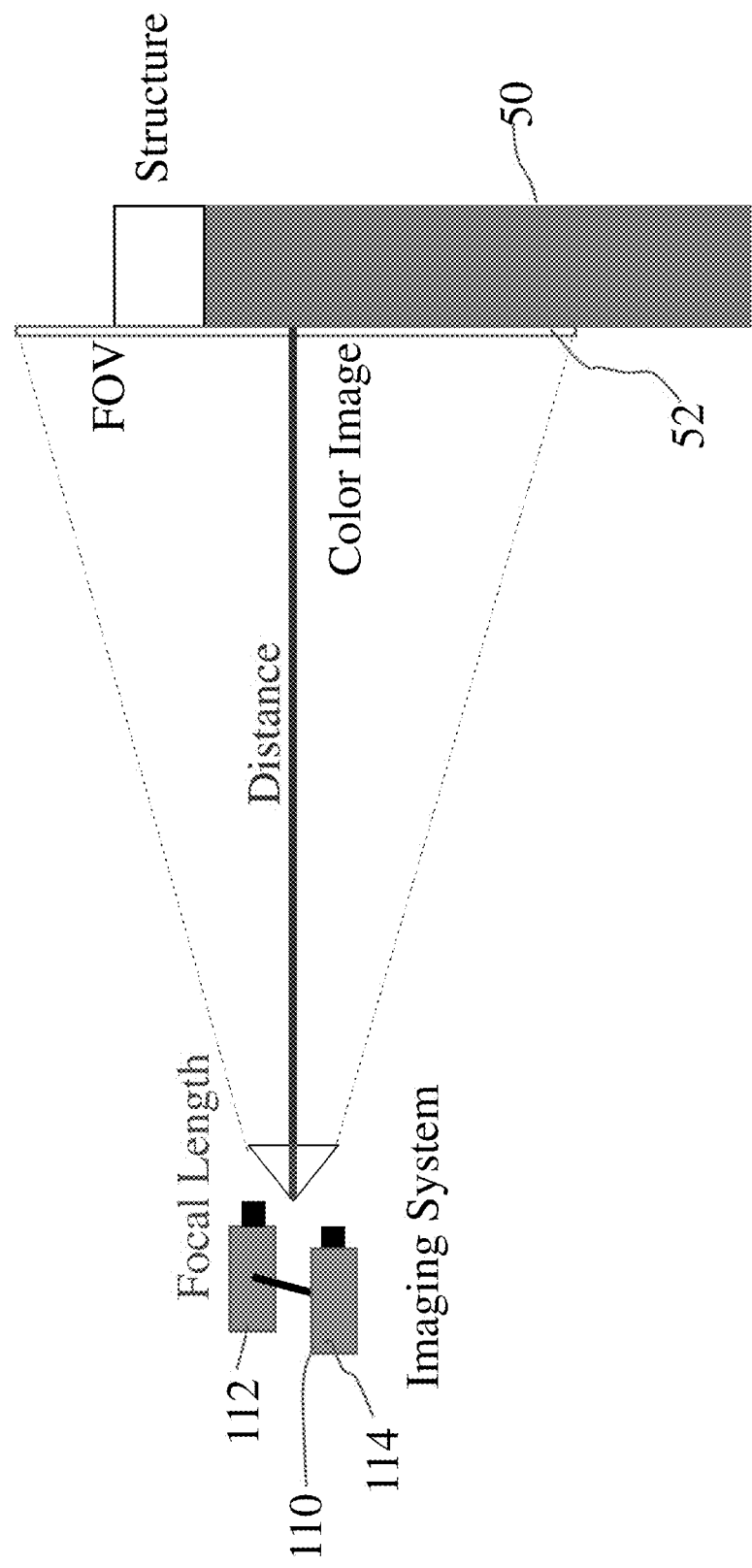
FIG. 2 shows a side elevational view of an imaging system aimed at a stationary structure.
Figure 3:
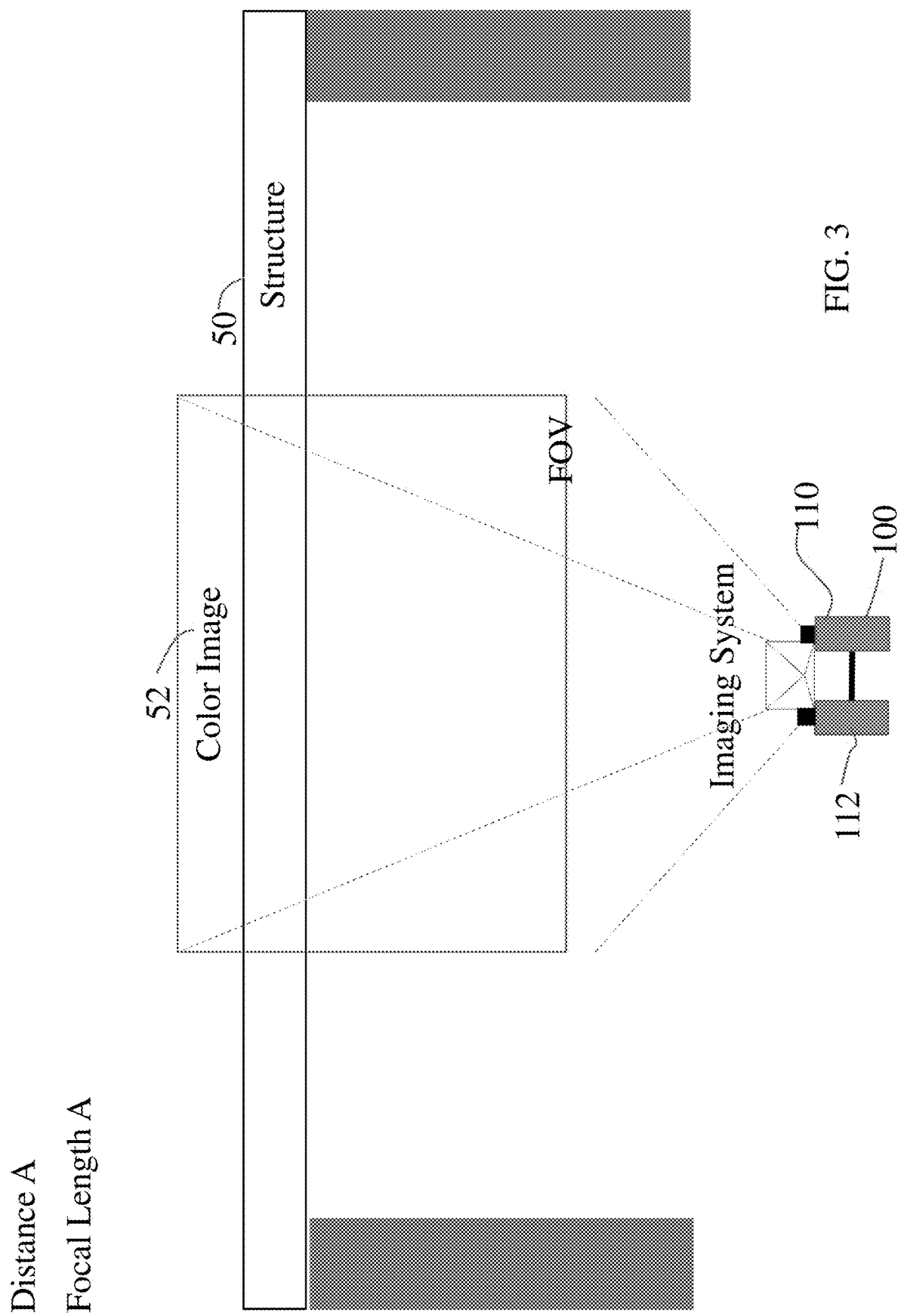
FIG. 3 shows a top plan view of the view of FIG. 2, with the imaging system being located a distance "A" from the structure.

FIG. 2 shows a side elevational view of an imaging system 110 aimed at a stationary structure. In an exemplary embodiment, the imaging system is a digital image correlation ("DIC") system 110 with two cameras 112, 114 aimed at a structure 50, with a multispectral color image 52 taken by observing the structure 50. The DIC system 110 is located a predetermined distance called object distance or simply distance in the FIG. 2. Using this distance and the value of the focal length, along with equations of optics as explained later in this invention, the optimal speckle sizes are determined. FIG. 3 shows a top plan view of the view of FIG. 2.

Figure 4:
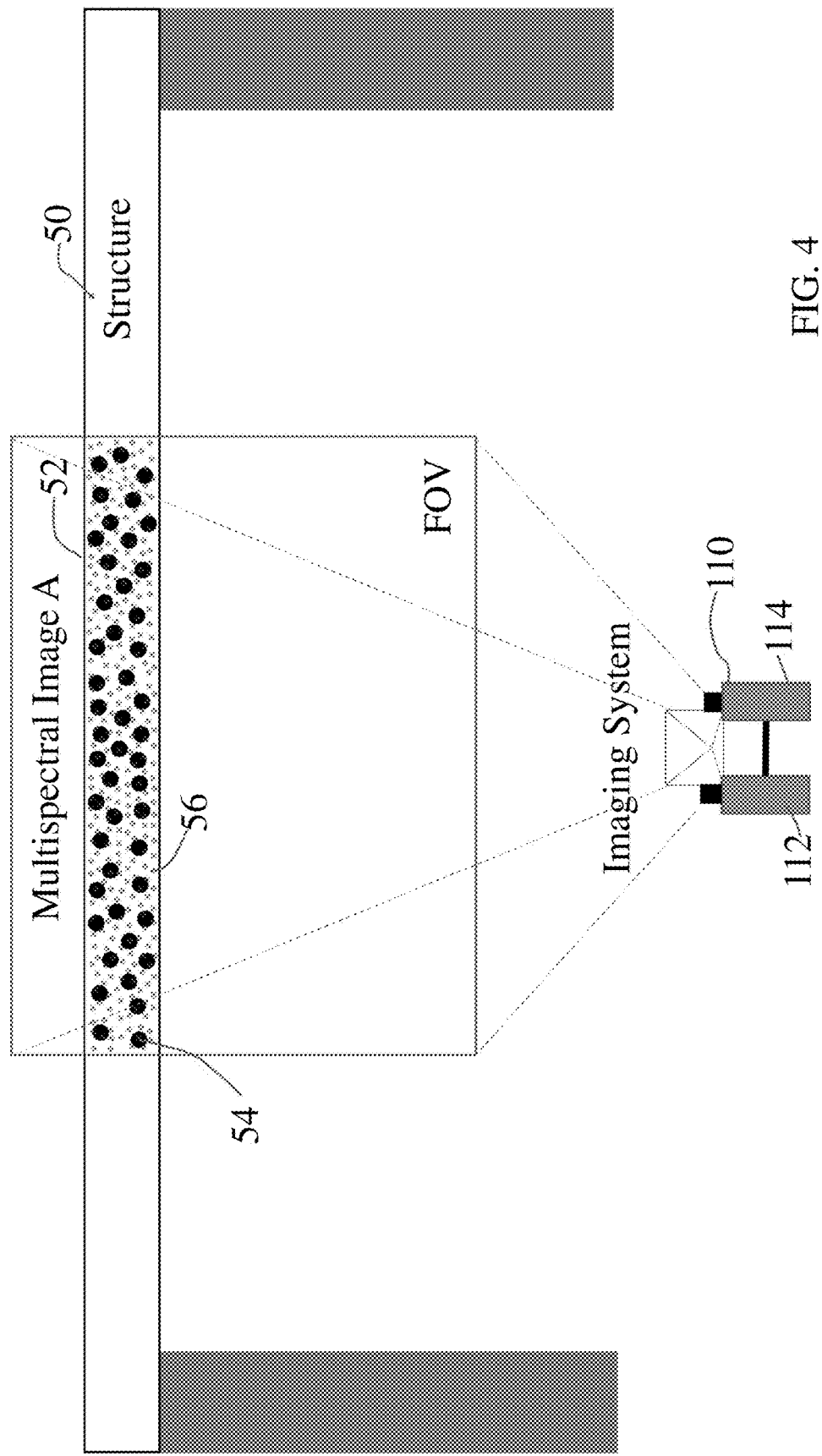
FIG. 4 shows the imaging system at a distance A and a focal length A.
Figure 5:
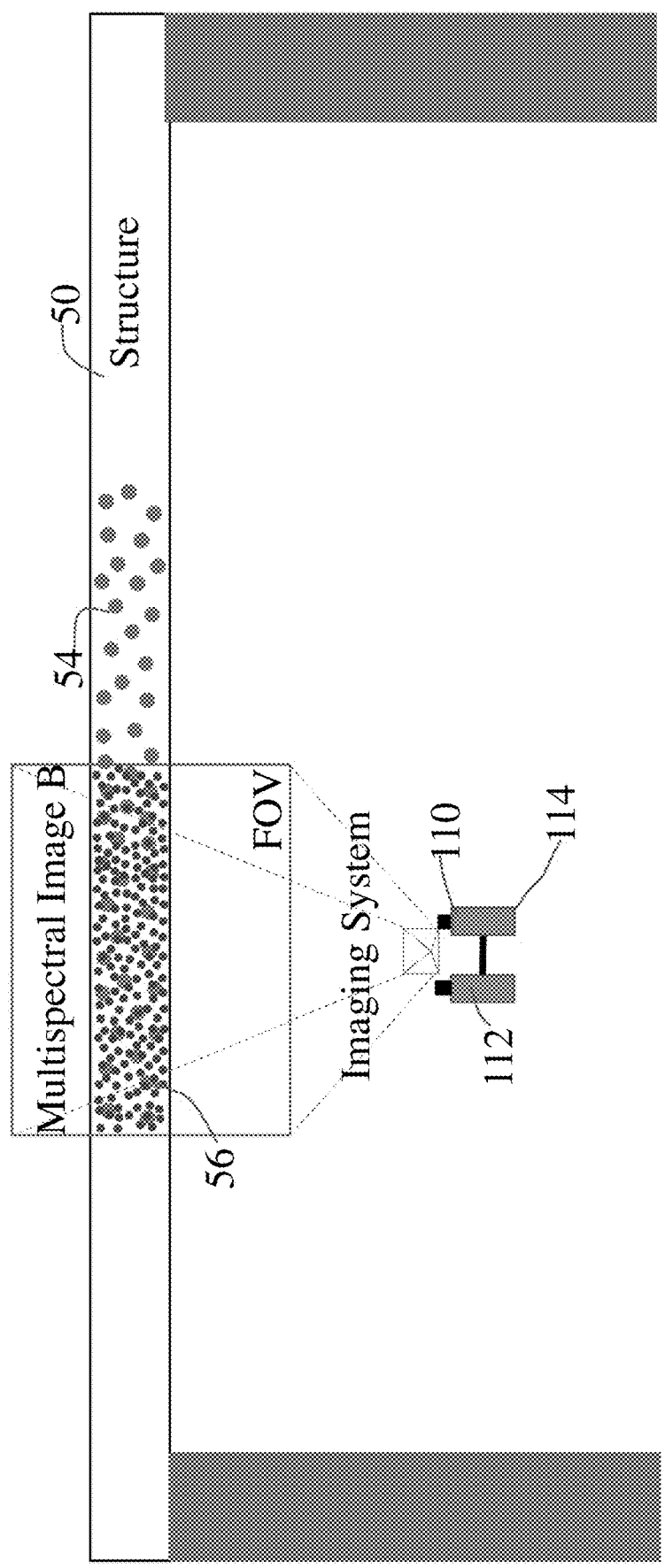
FIG. 5 shows the imaging system at a distance B and a focal length A.
Figure 6:
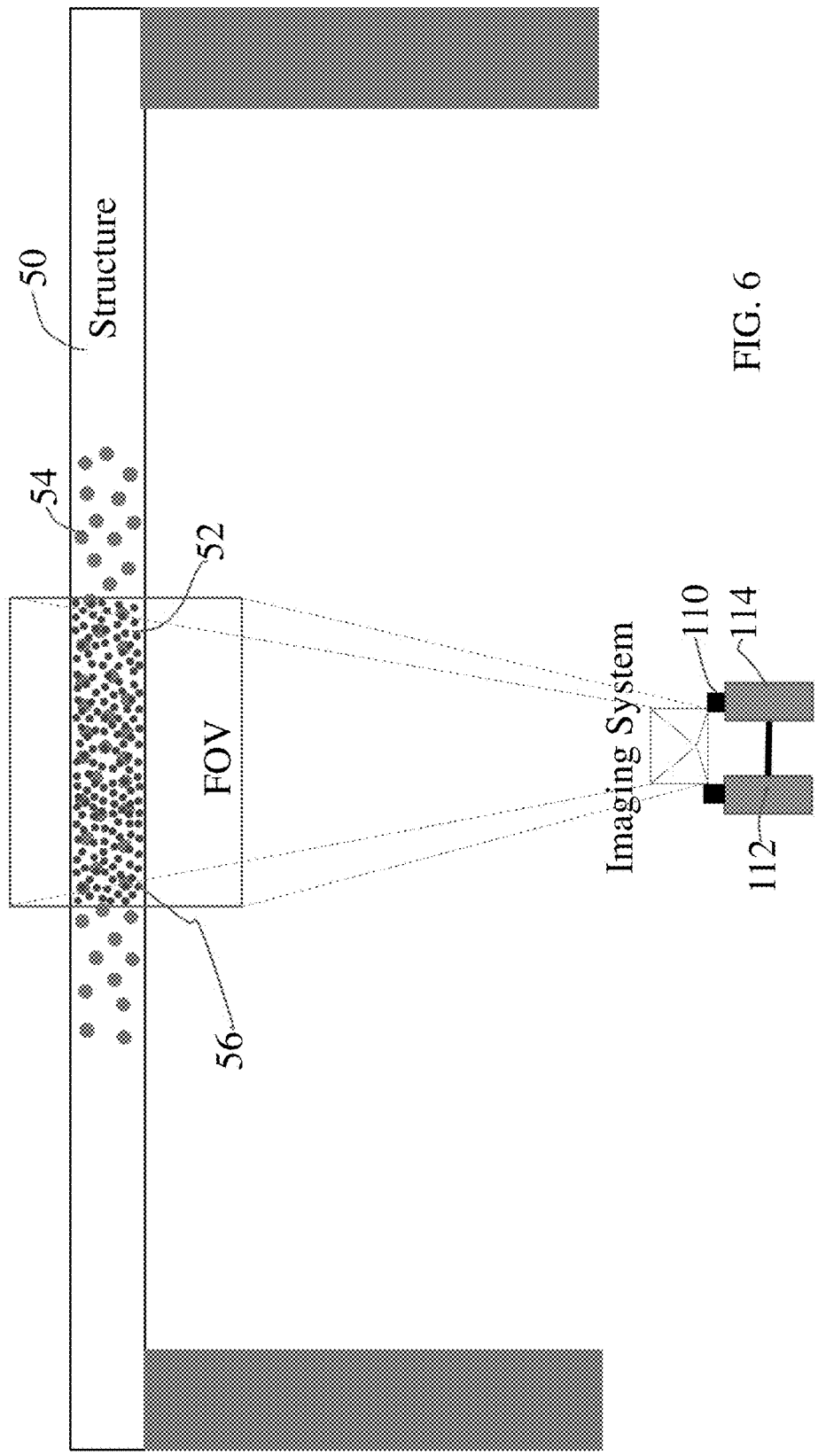
FIG. 6 shows the imaging system at a distance A and a focal length B.

FIG. 4 shows the imaging system 110 at a distance A and a focal length A, with the larger dots 54 being visible in the multispectral range A and the smaller dots 56 being invisible in the multispectral range A. FIG. 5 shows the imaging system 110 at a distance B and a focal length A, with the larger dots 54 being invisible in the multispectral range B and the smaller dots 56 being visible in the multispectral range B. FIG. 6 shows the imaging system 110 at a distance A and a focal length B, with the larger dots 54 being invisible in the multispectral range B and the smaller dots 56 being visible in the multispectral range B.

Figure 7:
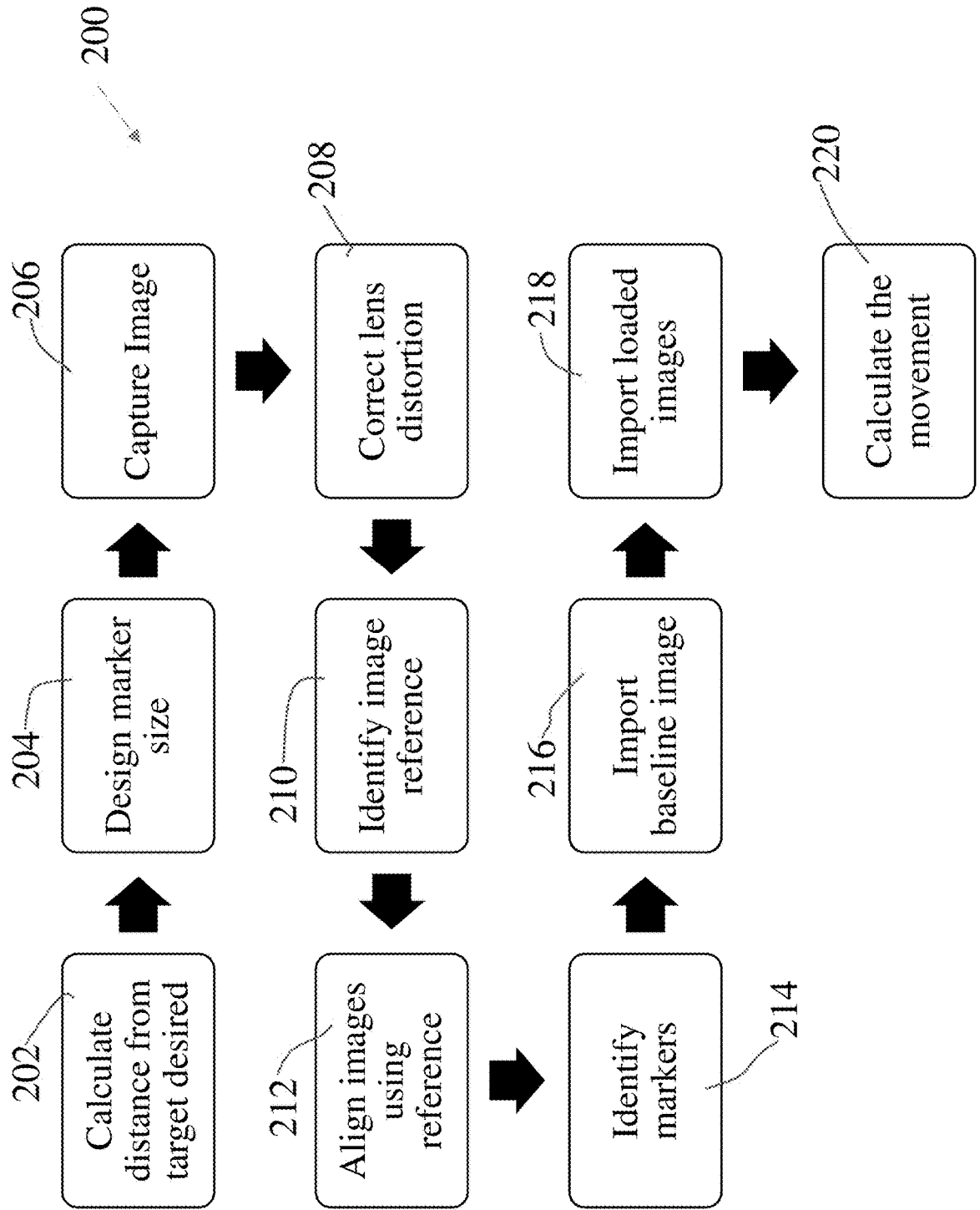
FIG. 7 is a flowchart showing operation of the inventive system.

FIG. 7 is a flowchart 200 showing an exemplary operation of the inventive system, with step 202 calculating the desired distance from the target and step 204 designing the size of markers 54, 56. In step 206, an image of the markers 54, 56 is captured on the surface 50. In step 208, a correction is made for lens distortion. In step 210, an image reference is identified.

In step 212, the images are aligned sing the reference and in step 214, the markers are identified. In step 216, a baseline image is imported. In step 218, loaded images are imported and, in step 220, movement of the images is calculated.

Given the state-of-the art as described above, the application of a multispectral pattern for multiscale deformation measurements at the structural scale using the DIC method is presented herein. Specifically, both a visible and an invisible to the human eye patterns were applied to a beam loaded in laboratory conditions to achieve deformation measurements at multiple scales. Optimized patterns based on camera settings and by using a number of globally and locally defined metrics were designed, manufactured, and applied for this purpose onto the beam which was loaded to multiple levels. The deformation measurements obtained by each pattern were compared to assess their performance in the context of their relative advantages in structural health monitoring applications.

2 APPROACH

2.1 Multispectral Speckle Pattern Design and Manufacturing

From a testing perspective, the results obtained by the DIC method rely on both speckle pattern properties as well as the camera and lens settings. Imaging at certain scales and resolutions is also influenced by the airy disk diameter of the reflected light. The airy disk is caused by the diffraction of light through the camera's aperture which generally causes blurring. To quantify such effect, the airy disk can be computed as $$I(\theta_p) = 4I_0 \left( \frac{J_1\left(\frac{2\pi}{\lambda} \cdot a \cdot \sin(\theta_p)\right)}{\frac{2\pi}{\lambda} \cdot a \cdot \sin(\theta_p)} \right) \quad (1)$$

where $I(\theta_p)$ is the resolving power, $J_1(x)$ is the first-order Bessel function, $\theta_p$ is the angle per pixel, $\lambda$ is the wavelength and $I_0$ is the intensity at the center of the disk of the incident light, while a is the size of the aperture. Practically, shorter wavelengths result in higher values of $I(\theta_p)$. In general, the achieved resolving power affects the discernible spacing between two points in the FOV, the definition of which affects image registration for given light intensity values. Leveraging this information, it is theoretically possible to design patterns in the same FOV that due to their differences in their resolving power could produce coarser or finer measurements for a given incident light.

Presently, a 24 megapixel Sony a6000 camera was used which has a CMOS of 23.5 mm by 15.6 mm with a Bayer filter. The lens was set to have a fixed focal length of 16 mm throughout the experiment. The angle per pixel was determined using Equation (2)

$$\theta_p = \frac{\arctan\left(\frac{s_y}{2f}\right)}{\frac{N_y}{2}} \quad (2)$$

where $s_y$ is the vertical size of the sensor in millimeters, f is the focal length in millimeters, and $N_y$ is the number of pixels in the vertical direction. The angle per pixel was then used to determine the size of the speckles (S) based on the object distance (O) and the number of pixels per speckle (n) using Equation (3).

$$S = \tan(n \cdot \theta_p) \cdot O \quad (3)$$

To validate that the computed size of the speckles was adequate to make valid measurements, several images of a crack card were taken at multiple distances and analyzed to determine the smallest resolvable speckle size with a specified number of pixels. In fact, the minimum size of a speckle, for speckle registration purposes, is recommended to be at least 3×3 pixels, so n was set to be 3. A schematic representation of the variables in Eq. (3) is provided in FIG. 8A. The images shown in FIG. 8B were taken at 6, 12, 18, and 24 inches away from the crack card, and were compared to the results of Equation (3). Consequently, FIG. 8C shows the raw image of the smallest resolvable line in the crack card while FIG. 8D provides image close-ups of these lines where the black box in them corresponds to a 3×3 pixel neighborhood as defined to be the smallest acceptable size of the speckle. Based on this information, FIG. 8E demonstrates that theoretical and experimental results correlate well for this camera lens system and the minimum acceptable speckle size for several distance values from the target are obtained. Using the results in FIG. 8E as a type of calibration, the optimal speckle size given a choice of a working distance was quantitatively determined for the purposes of the investigation as shown next.

In addition to size, the spatial distribution of speckles is also a key parameter in creating acceptable patterns in DIC. In this context, several metrics for determining the global and local quality of the pattern have been introduced. Theoretical analysis shows that the standard deviation of the difference between the estimated and exact displacement values is inversely proportional to the sum of the squares of subset intensity gradient (SSSIG) at each pixel, as shown in Equation (4) below, where $x_{ij}$ is the pixel value, N is the subset size and $f_x(x_{ij})$ is the x-directional intensity derivative at pixel $x_{ij}$.

$$SSSIG(x_{ij}) = \sum_{i=1}^{N} \sum_{j=i}^{N} [f_x(x_{ij})]^2 \quad (4)$$

The SSSIG metric, however, cannot assess the quality of the entire speckle pattern, and thus the same theoretical analysis is extended to the global scale by calculating the mean intensity gradient (MIG), defined as $$MIG = \sum_{i=1}^{W} \sum_{j=1}^{H} |\nabla f(x_{ij})|/(W \times H) \quad (5)$$

where W and H are the image width and height while $|\nabla f(x_{ij})|$ is the size of the directional intensity gradient vector.

Specifically, subset-based DIC reduces to a minimization problem when comparing unique subsets between the deformed and reference images. Hence, speckle patterns with higher gradients across the entire FOV (global quality—MIG) and individual subsets (local quality—SSSIG) result in less error. Generally, as MIG values increase for given reference datasets, the local SSSIG and quality metrics such as subset entropy also increase indicating better quality speckle patterns. In general, higher values in such metrics indicate more feature texture which is better in terms of the tracking process in DIC. Furthermore, the smaller the size of the particles is (i.e. the smaller the particle area) and consequently as the speckle number increases in a given FOV, the higher the MIG values becomes. Therefore, it is optimal to use in DIC the smallest resolvable speckles and as many of them as possible for a given choice of a FOV to increase the quality of measurements. However, the speckle size is limited for any camera system to be 3×3 pixels, as mentioned earlier, since fewer pixels may result in aliasing of the pattern and failure in registering which consequently causes the loss of subsets. Furthermore, the speckles within each subset are required to be unique within a search radius to ensure proper tracking.

Figures 9A, 9B, 9C, 9D:
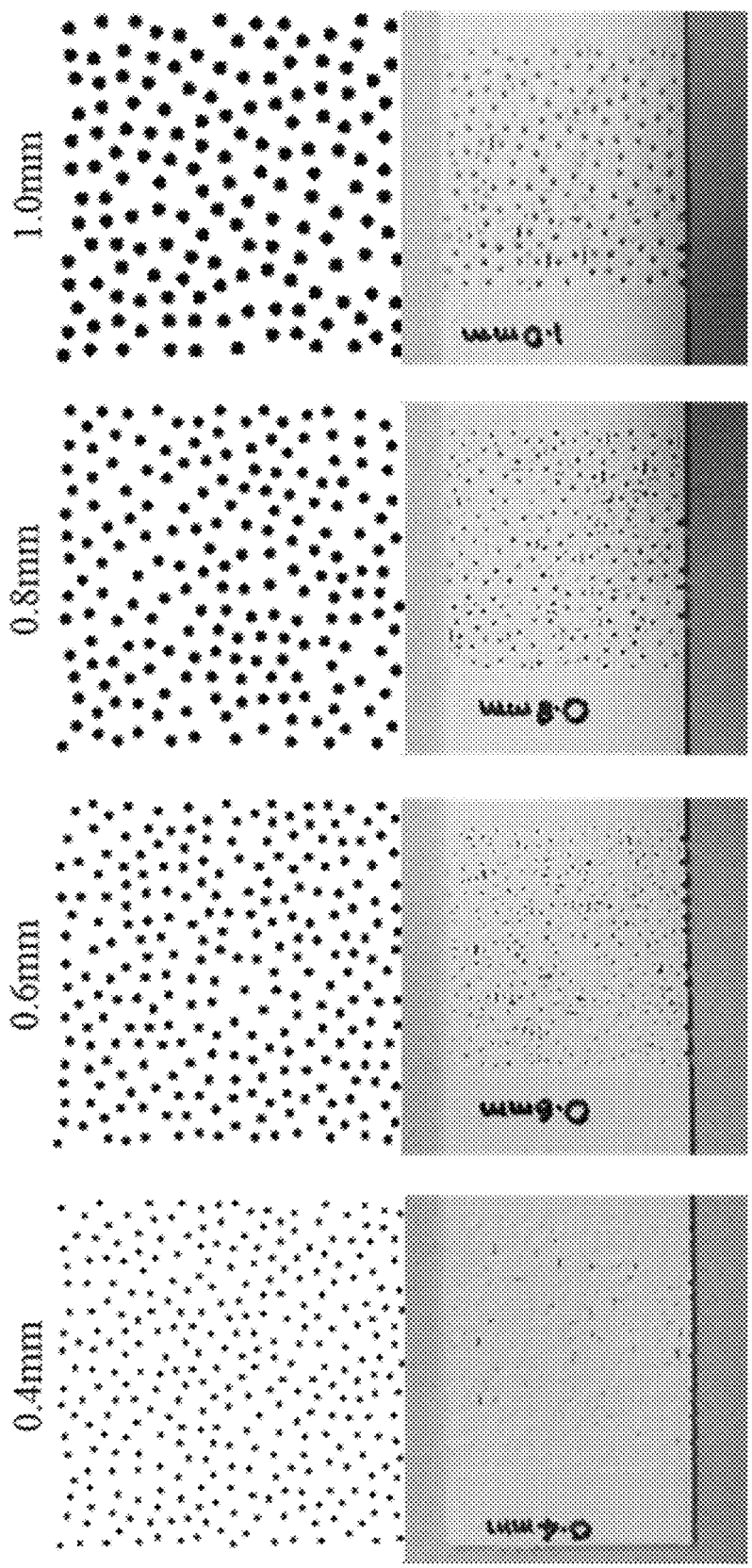
FIG. 9A shows an experiment using computer-generated speckle templates to determine the minimum speckle size for DIC measurements using speckles having a diameter of 0.4 mm.
FIG. 9B shows an experiment using computer-generated speckle templates to determine the minimum speckle size for DIC measurements using speckles having a diameter of 0.6 mm.
FIG. 9C shows an experiment using computer-generated speckle templates to determine the minimum speckle size for DIC measurements using speckles having a diameter of 0.8 mm.
FIG. 9D shows an experiment using computer-generated speckle templates to determine the minimum speckle size for DIC measurements using speckles having a diameter of 1.0 mm.

Based on the information presented in this section, the minimum speckle sizes and the spacing between speckles for multiscale deformation measurements were determined so that the manufacturing of stencils to apply them would be possible given the minimum print resolution of an available 3D printer. To practically check the printer resolution, several point clouds consisting of circles with variable diameter were first created numerically and then printed. Point clouds were generated using a closest distance constraint while selecting speckle centers derived from a random function generator. Specifically, the top images in FIGS. 9 A-9D show the designed patterns corresponding bottom images show the resulting templates created by the 3D printer. The produced stencils had clear through-holes (needed to deposit the paint when applying the speckle pattern) only on the template with 1 mm diameter circles while the others were found to be either completely or partially blocked. Consequently, the smaller print size of such circles for the 3D printer was set to 2 mm with a minimum spacing of 1.5 mm between speckles to ensure manufacturability. The larger dot size was then determined based on the image registration limit and the object distance. Hence, since the smallest size acceptable is 3×3 pixels, the larger speckles were set to have a 6 mm diameter.

Based on this approach and the aforementioned background information on speckle pattern properties, 2 mm speckles were created for a working distance of 2 meters (called "near" in the text) while the 6 mm speckles were optimized for a distance of 6 meters (called "far" in the text). A linear ratio of 1 mm per 1 meter distance can be extrapolated from these values. Standard and UV MIG values taken from the far distance were computed to 95.06 and 35.68 respectively. Images taken at the near field had standard illumination vs UV MIG values of 90.77 and 65.53, respectively. It should be noted here that the use of a non-UV specific image acquisition system picking up the larger speckles reduced the gradient distribution resulting in lower MIG values for UV at the near distance.

FIGS. 10, 10A and 10B shows a schematic representation of the experiment with the two different speckle sizes (FIGS. 10A and 10B) optimized to work at two different distances. The horizontal FOV is represented by the horizontal angle of view of the camera system (8) and does not change for the near and far distances.

The actual stencils which were manufactured are shown in FIGS. 11A1 and 11A2, while the resulting speckle patterns optimized to work in the visible and UV spectrum are shown in FIGS. 11B1 and 11B2.

2.2 Optimized Pattern Generation for Length Scale Adjustment

To generalize the procedure of speckle pattern generation, images with higher quality metric values can be created if properties in the frequency spectrum are leveraged. In fact, such approach also generalizes the method described herein to be applicable to any selected FOV by ensuring image quality metrics consistency.

Specifically, according to this methodology images are converted to the frequency domain using the 2D discrete Fourier Transform (2D-DFT) described in Equation (6):

$$F(u, v) = \sum_{x=0}^{M-1} \sum_{y=0}^{N-1} f(x, y) e^{-2\pi i(ux/M + vy/N)} \quad (6)$$

where f(x,y) is a digital image of size M×N with F(u,v) being evaluated in the ranges of u=0, 1, ..., M−1 and v=0, 1, ..., M−1. F(u,v) is also the same size as the original image. Because the 2-D DFT is complex in general, it can be expressed in polar terms as well:

$$F(u,v) = |F(u,v)| e^{i\phi(u,v)} \quad (7)$$

where the magnitude $$|F(u,v)| = [R^2(u,v) + I^2(u,v)]^{1/2}$$

is called the Fourier power spectrum and the phase angle $\phi(u,v)$ is defined as $$\phi(u, v) = \arctan\left[\frac{I(u, v)}{R(u, v)}\right] \quad (8)$$

Given this conversion, the original image can be recreated using a target Fourier spectrum and phase angle. Within the recreation process it is realized that the power spectrum carries the gradient information while the phase angle carries the shape and distribution information contained within the image of a speckle pattern. Studying the power spectrum of generated images following this approach shows that scaling has no effect on the result of image reconstruction. Hence, an image with a speckle pattern at one length scale could be used to generate a corresponding image with a speckle pattern at any other arbitrary scale that has the same image quality properties as the optimized speckle patter at the original scale.

Figures 12A, 12B:
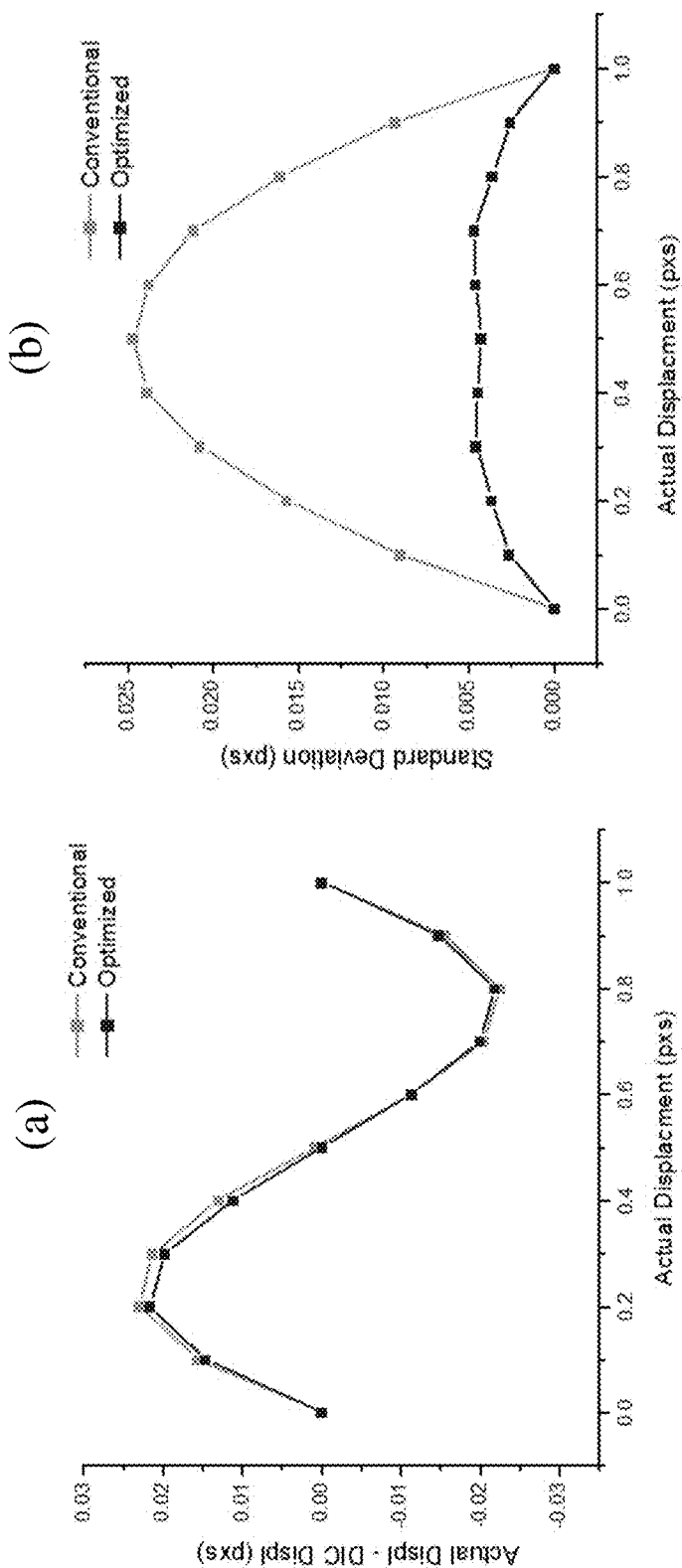
FIG. 12A shows Gaussian displacement synthesized based on the conventional and optimized approaches.
FIG. 12B shows the error in terms of the standard deviation of the actual displacement vs DIC extracted displacement.

To test this approach, a relatively sharp Gaussian power spectrum was synthesized as shown in FIG. 12A and an image was reconstructed with the phase angle of a speckle size-controlled image. Images of this reconstructed optimized pattern were numerically shifted at the subpixel level using a numerical binning approach. The same process was also applied to a conventionally applied speckle pattern image. The error analysis shown in FIG. 12B run on the actual displacement vs DIC extracted displacement showed a significant reduction in random errors while maintaining low and acceptable systematic error values. This is contributed to the controlled consistency of the speckle size of the optimized image.

2.3 Experimental Validation of the Proposed Methodology

Figure 13A:
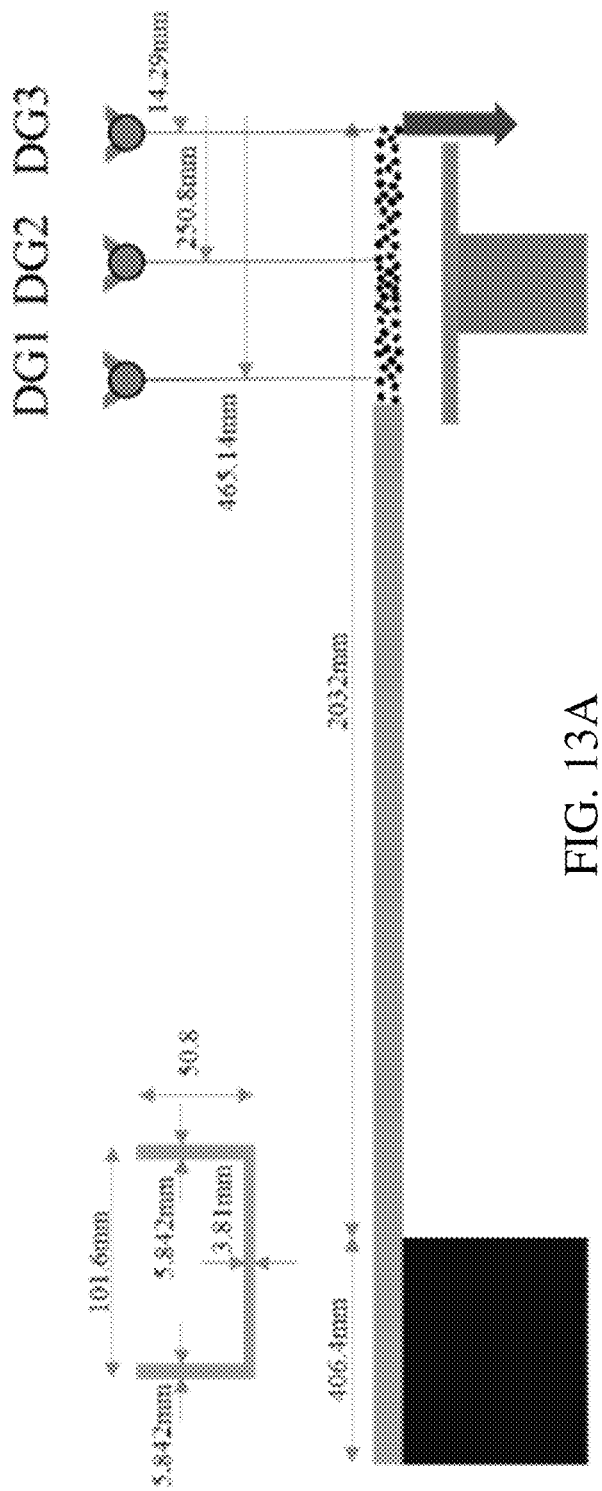
FIG. 13A shows a C-beam fixed on one side and loaded on the other
Figure 13B:
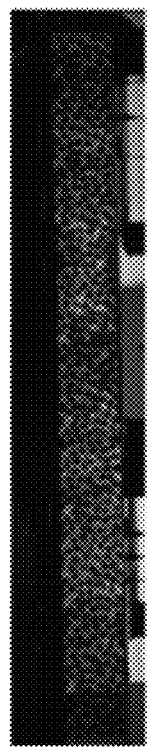
FIG. 13B shows a smaller speckle pattern applied to the beam of FIG. 13A using an airbrush and a clear paint with pigment inside that appeared bright only when black light was incident
Figure 13C:
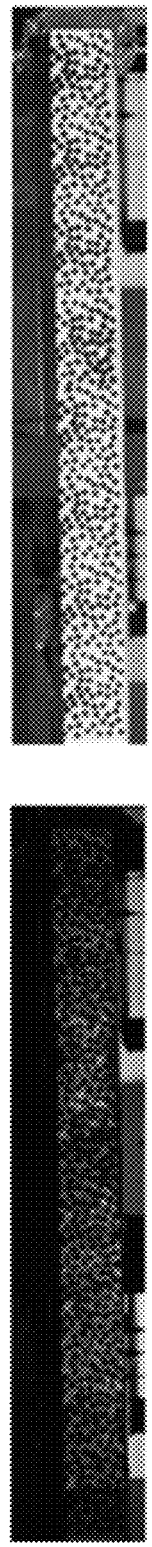
FIG. 13C shows the beam of FIG. 13A during the experiment when visible light is used.

A C-beam, i.e. a beam with a C-shaped cross-section, fixed on one side and loaded on the other was selected as the structural component to demonstrate the proposed approach, as shown in FIG. 13A. The beam was first coated in white paint followed by the application of the larger speckle pattern using black spray paint and the larger stencil in FIG. 11A. Then, the smaller speckle pattern was applied using an airbrush and a clear paint with pigment inside that appeared bright only when black light was incident, as shown in FIG. 13B. The speckle patterns were located on the loading side while three displacement gauges were also attached for validation purposes. Floodlights were used to ensure that the visible spectrum was as uniform as possible throughout the experiment. The images shown in FIGS. 13B and 13C were taken during the experiment when the two types of lighting including black (FIG. 13B and visible (FIG. 13C) were applied. It can be noted that the color of the smaller speckles which were reflective under the black light appeared to be blue.

The only camera setting that differed when switching from standard to black illumination was the exposure time. This ensured that the depth of field, noise properties, and magnification from the lens was the same for both light ranges. Hence, measurements were directly comparable since the exposure time has the least effect on the image quality aside from changing the brightness. The camera parameters for the standard illumination and UV reflective patterns are shown in Table 1.

TABLE 1

Camera Settings for the Experiment

| Camera Parameters | Standard | UV |
| --- | --- | --- |
| Aperture | f/22 | f/22 |
| Exposure Time | 0.5 s | 4 s |
| ISO | 100 | 100 |
| Focal Length | 16 mm | 16 mm |

Figure 14:
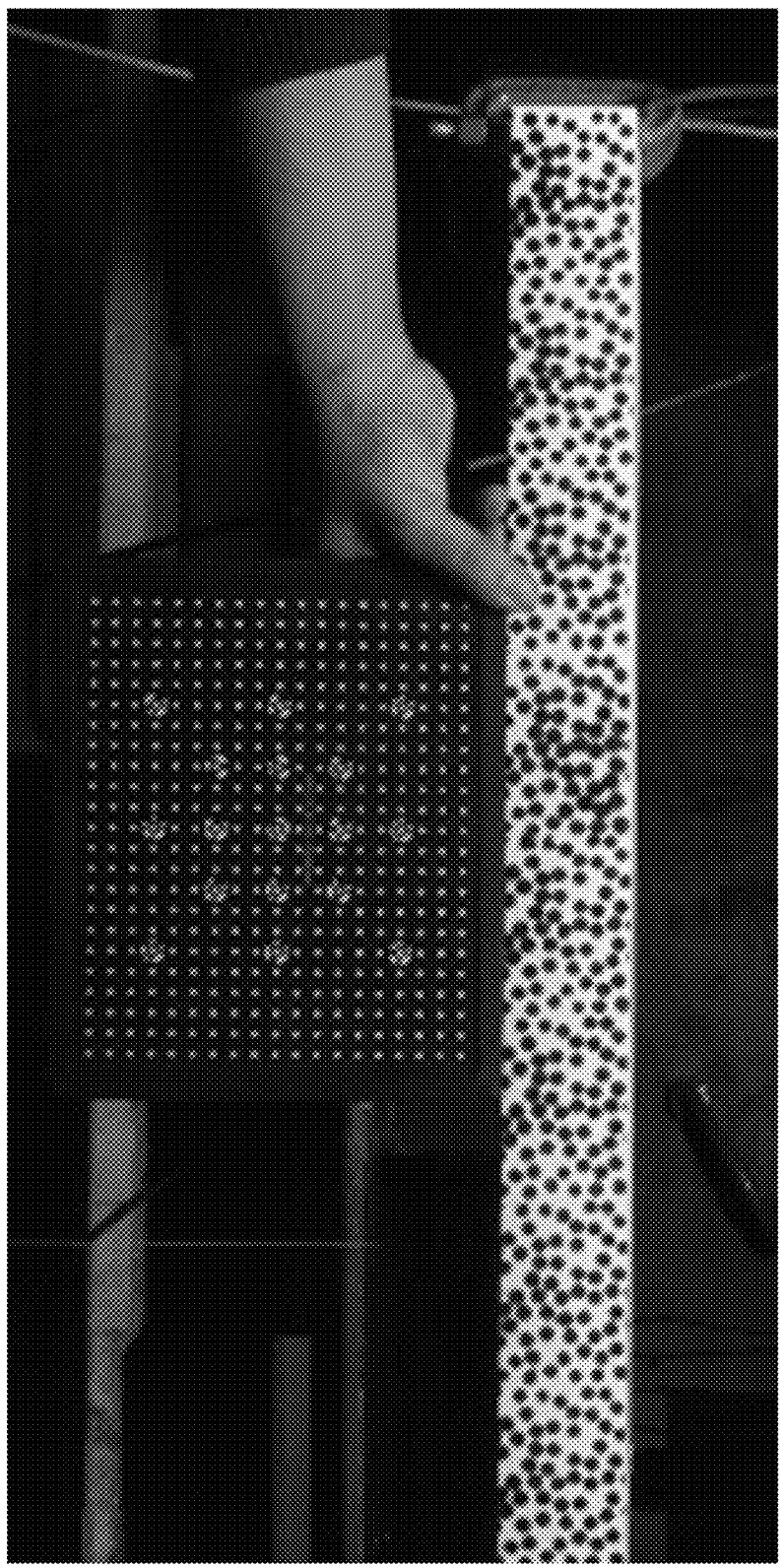
FIG. 14 shows a calibration panel used to determine distance per pixel.

Since 2D DIC was used for this experiment, the distance per pixel was required to convert the pixel to distance measurements. Since the camera did not move during the test, calibration images were taken of a target prior to the experiment with known distances between a number of markers. Specifically, a DIC calibration panel (GOM/CP 20/MV 90×72 $mm^2$) was aligned with the beam as shown in FIG. 14.

Figure 15B:
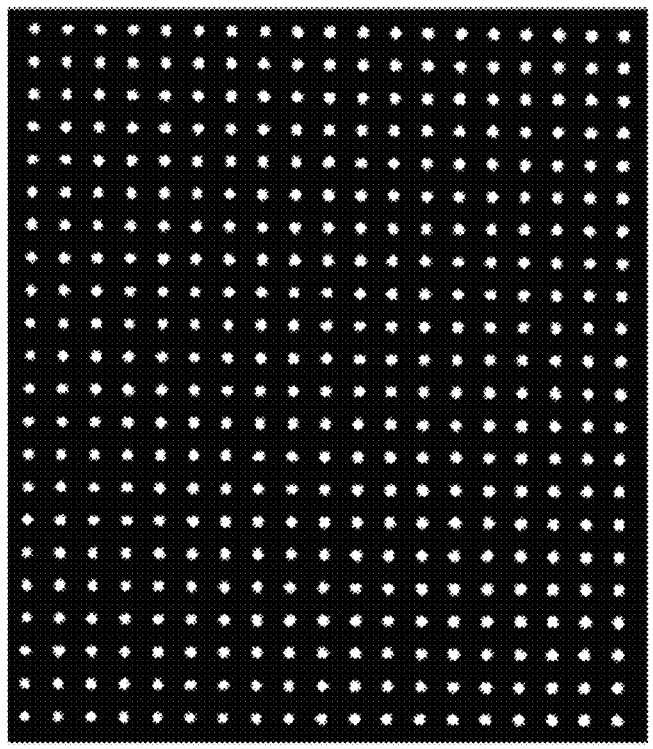
FIG. 15B shows only blobs that existed at the intersections of the lines ensuring only known points on the calibration panel.
Figure 15A:
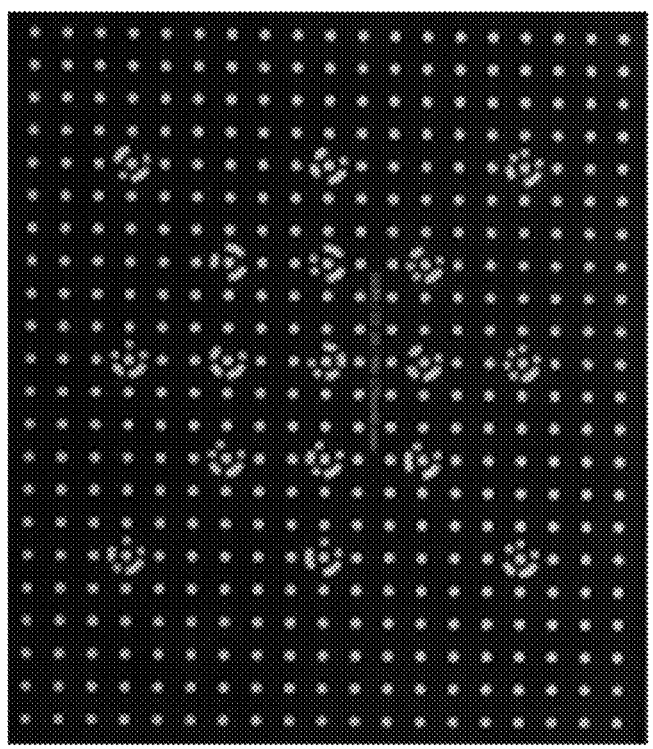
FIG. 15A shows point sizes and distances on a calibration panel.

Point sizes and distances on the calibration panel are a priori known and the recorded images were processed to isolate dots in the calibration panel, as shown in FIG. 15A. The segmentation of the dots was accomplished with thresholding using the Otsu method, followed by the Hough transform used to identify lines across the image. Finally, only blobs that existed at the intersections of the lines were selected ensuring only known points on the calibration panel was selected, as shown in FIG. 15B. The distance between each of the points on the panel was known and could be then used to compute the 2D parameter. The relatively large number of points in these images provided confidence in the measurements of distance per pixel. Using this technique, the 2D spatial parameters at the near and far distances were determined to be 0.46 mm/pixel and 1.38 mm/pixel, respectively.

3 RESULTS

The images that the DIC algorithm accepts are grayscale. Due to the Bayer filter in the camera, the green band of the image has the highest amount of spatial content. Therefore, rather than simply converting the images to grayscale, the green band was isolated and processed so the highest spatial content was used and information was not averaged across the bands with less spatial content.

The subset size used for the near distance was 21 pixels with a step size of 10 pixels. This ensured a significant amount of overlap of the subsets to obtain reliable measurements. The subset size used for the far distance was 11 pixels with a 5 pixel step size. Noise floors were compared for multiple images taken at the reference stage. Standard illumination at the far scale had a noise floor of 0.5 mm in terms of Y-displacement in comparison to UV speckles having a noise floor of 0.367 mm at zero loading. The near scale standard illumination had a noise floor of 0.269 mm in comparison to UV noise floor at 0.181 mm at zero load. It must be noted that to further reduce the noise floor, multiple images were taken and averaged at each stage. The displacement measurements for the gauges and the image-based measurements at the corresponding load values were recorded for near and far scales and are shown in FIGS. 16A and 16B, respectively.

The "o" markers in FIGS. 16A and 16B correspond to the measurements taken from the three displacement gauges as shown in FIG. 13A; the position of the markers (from top to bottom) represent DG1, DG2 and DG3 respectively. To compare image-based displacement measurements to the ground truth, the end of the beam was used to determine the location of the displacement gauges. The values of the subset closest to this location were compared to the displacement gauges.

Figures 17A, 17B:
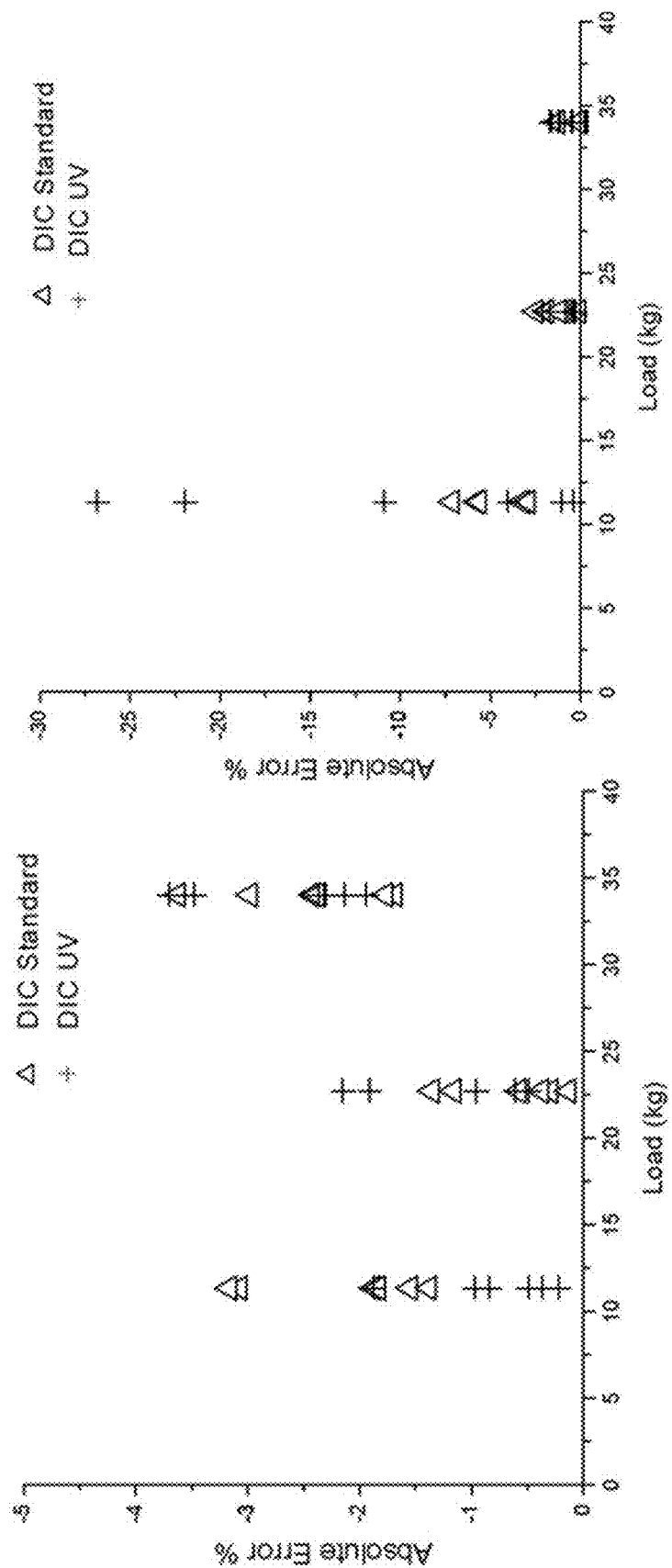
FIG. 17A shows percentage error of DIC data with respect to the displacement gauges at 2 m scales.
FIG. 17B shows percentage error of DIC data with respect to the displacement gauges at 6 m scales.

It is clear from the plots in FIGS. 16A and 16B that the DIC measurements using the designed speckle patterns performed well with respect to the displacement gauges. To quantify this comparison, FIGS. 17A and 17B shows the computed errors at both near (FIG. 17A) and far (FIG. 17B) scales. It must be noted here that imaging smaller speckles at the further distance causes aliasing which in turn deters the subset registration process in DIC leading to erroneous results. One of the major sources of error is the 2D parameter set in the DIC algorithm is to calculate the deformation in length units from measurements in pixels. Hence, small errors in measurements made in pixels could result in significant errors in actual displacement calculations, particularly for the larger loads applied.

Due to the required sizes of the speckle patterns based on the available manufacturing capabilities and the color camera used for the measurements previously shown, errors were expected. While such errors can be reduced by using larger subsets (larger information content), this choice would also reduce the spatial resolution of the results. On the other hand smaller subsets work better with smaller speckle sizes. However, FIGS. 18A and 18B demonstrate that the speckle patterns that were optimized for a given distance had a lower noise spread compared to the other pattern in the same FOV.

Figures 18A, 18B:
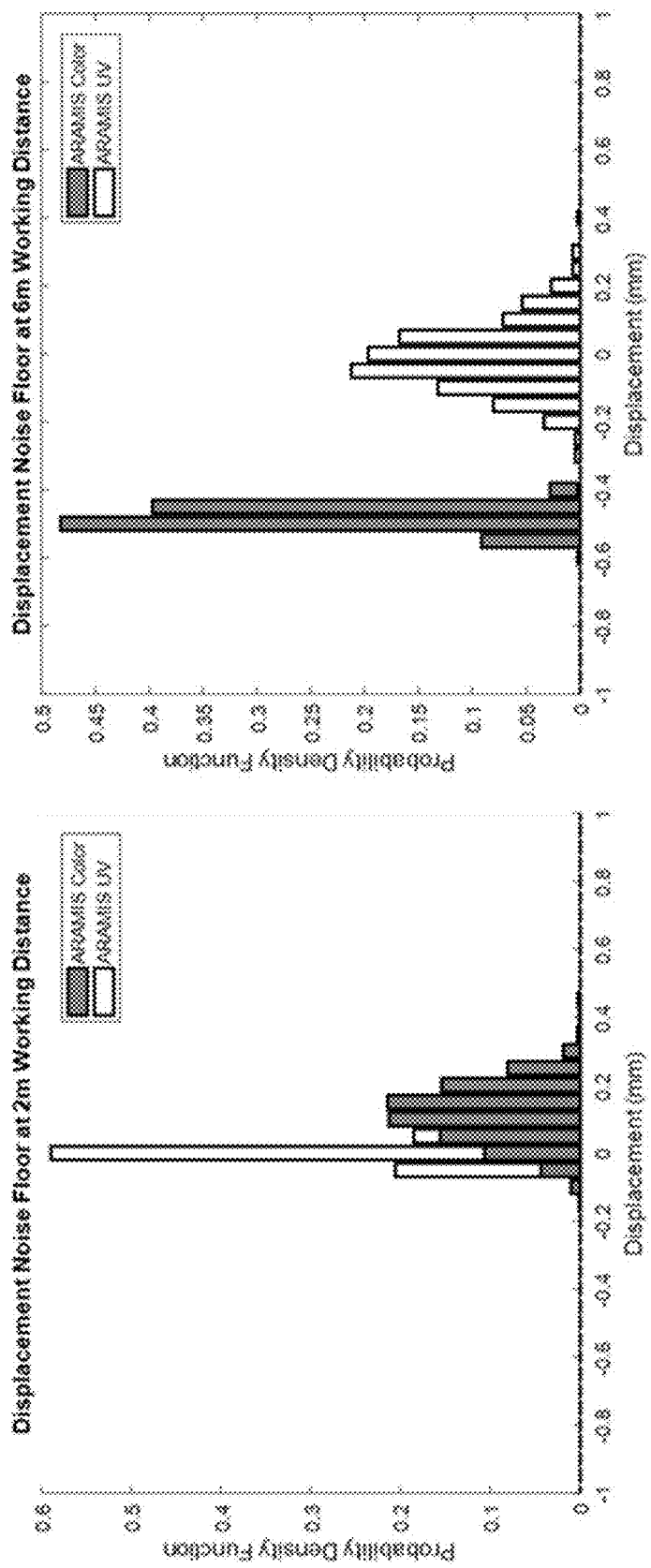
FIG. 18A shows noise floor at a 2 meter distance.
FIG. 18B shows noise floor at a 6 meter distance.

To demonstrate this fact and its importance in this investigation, FIG. 18A shows the distribution of the vertical displacement with zero load at the 2 meter distance. It is clear that the UV pattern, in white, has a smaller spread than the standard illumination pattern shown in gray. Similarly, FIG. 18B shows the distribution of the displacement with zero load at the 6 meter distance. It is clear that the UV pattern in white has a larger spread than the standard illumination pattern in gray which demonstrates that the particular pattern that was designed for a specified distance performed better than the other pattern that was not designed for that choice of a distance. The mismatch in the center of the distributions in FIG. 18B is due to the beam not returning to the original position due to imperfect clamping on the fixed end of the beam.

This is further validated by Table 2 where the computed average absolute error is lower for the larger speckles designed to perform at standard illumination at the farther scale. The same is seen for the smaller speckles designed to perform optimally for UV light at the near scale. The values for the near scale are comparable since the camera is not imaging purely in the UV spectrum and thus picks up gradients from the larger speckles behind the overlaid UV reflective smaller speckles.

TABLE 2

Absolute error percentage comparison

|  | Standard Illumination DIC | UV DIC |
|---|---|---|
| Far (6 m) | 2.19% | 4.30% |
| Near (2 m) | 1.76% | 1.52% |

4 CONCLUSIONS

This invention demonstrates a methodology to perform multiscale deformation measurements using optical metrology. The major focus of this investigation was on displacement measurements using patterns suitable for the application of the digital image correlation method which were further optimized to function at two different working distances. Appropriate physics and camera parameters were leveraged to choose the wavelengths for use with a priori specified working distances. This information was then used to manufacture patterns using 3D printed stencils that were applied in laboratory conditions on a beam. Several benefits of using multiple bands of light were demonstrated including the manufacturing of patterns that are not visible in the visual spectrum in addition to combining patterns to perform reliable deformation measurements. The results presented further demonstrate that each pattern has an optimal working distance associated with it which allows the design of multispectral patterns for use in remote sensing with optical metrology methods.

Other advantages and benefits of the present invention include:

1. Measurements of deformation using remote sensing give a more complete view of the health of the structure because point based measurements only give displacement and strain values at the point that the sensor is located. The full field non-contact nature of the method presented allows the full field deformation of the structural element to be analyzed.

2. The use of full field multispectral imaging data allows the user to compute deformation from multiple fields of view of the structure. This provides global and local deformation data at different spatial resolutions.

3. Using speckle patterns resolvable outside the visible spectrum also adds to the aesthetics of the structure while still providing valuable deformation data.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A multiscale deformation monitoring method comprising the steps of:
   (a) selecting a structure by choosing a field of view (FOV), the FOV having a defined size;
   (b) applying a first optimized speckle pattern to the structure such that the first speckle pattern is only visible within a first wavelength range, wherein the first speckle pattern has first properties comprising a first speckle size, a first inter-speckle spacing, and a first spatial distribution, wherein the first properties are controllable in relation to the FOV, and wherein the first properties can be reproduced for any other desired FOV while preserving the first properties;
   (c) applying a second optimized speckle to the structure, different from the first speckle pattern, such that the second speckle pattern is only visible within a second wavelength range, different from the first wavelength range, wherein the second speckle pattern has second properties comprising a second speckle size, a second inter-speckle spacing, and a second spatial distribution, wherein the second properties are controllable in relation to the FOV, and wherein the second properties can be reproduced for any other desired FOV while preserving the second properties; and
   (d) using the first and second speckle patterns to apply a digital image correlation method (DIC) to the structure and to extract three-dimensional deformation and damage information from the structure, wherein the first speckle pattern is controlled and customized to provide information at an arbitrary first scale, the first scale being smaller than the size of the FOV, and wherein the second speckle pattern is controlled and customized to provide information at a second scale, the second scale being the size of the FOV.

2. The method according to claim 1, wherein the first wavelength range is within the visible light range.

3. The method according to claim 2, wherein the second wavelength range is within the ultraviolet wavelength range.

4. The method according to claim 2, wherein the second wavelength range is outside the visible light range.

5. The method according to claim 1, wherein the first speckle pattern is comprised of speckles having a first size and wherein the second speckle pattern is comprised of speckles having a second size, different from the first size.

6. The method according to claim 1, wherein step (d) comprises spacing DIC cameras a predetermined distance from the structure.

7. The method according to claim 6, wherein step (d) comprises placing the DIC cameras a first distance from the structure to image the first speckle pattern and placing the DIC cameras a second distance from the structure to image the second speckle pattern.

8. A multiscale deformation monitoring method comprising the steps of:
(a) applying a first optimized speckle pattern to a structure such that speckles in the first speckle pattern have a first speckle size, a first inter-speckle spacing, and a first spatial distribution;
(b) applying a second optimized speckle pattern to the structure such that speckles in the second speckle pattern have a second speckle size, a second inter-speckle spacing, and a second spatial distribution than the first pattern, different from the first size range, the first inter-speckle distance, and the first spatial distribution;
(c) applying a load to the structure;
(d) using the cameras to record images of the first and second speckle patterns using a DIC method; and
(e) extracting three-dimensional deformation and damage information from the structure wherein the first speckle pattern is leveraged to provide information at an arbitrary first scale, the first scale being smaller than the size of the FOV, and wherein the second speckle pattern is leveraged to provide simultaneously information at a second scale, the second scale being the size of the FOV.

9. The method according to claim 8, wherein the first wavelength range is within the visible light range.

10. The method according to claim 9, wherein the second wavelength range is within the ultraviolet wavelength range.

11. The method according to claim 9, wherein the second wavelength range is outside the visible light range.

12. The method according to claim 8, wherein the first speckle pattern is comprised of speckles having a first size and wherein the second speckle pattern is comprised of speckles having a second size, different from the first size.

13. The method according to claim 8, wherein step (d) comprises spacing the DIC cameras a predetermined distance from the structure.

14. The method according to claim 13, wherein step (d) comprises placing the DIC cameras a first distance from the structure to image the first speckle pattern and placing the DIC cameras a second distance from the structure to image the second speckle pattern.

* * * * *